(12) United States Patent
Gretz (10) Patent No.: US 7,227,085 B1
(45) Date of Patent: Jun. 5, 2007

(54) RECONFIGURABLE CONDUIT BODY ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/494,664

(22) Filed: Jul. 27, 2006

Related U.S. Application Data (63) Continuation-in-part of application No. 11/393,202, filed on Mar. 30, 2006, now abandoned, which is a continuation-in-part of application No. 11/264,484, filed on Nov. 1, 2005, now abandoned.

(51) Int. Cl.
*H02G 3/08* (2006.01)

(52) U.S. Cl. .......................... 174/481; 174/58; 174/63; 220/3.2

(58) Field of Classification Search ................ 174/480, 174/481, 488, 504, 58, 63; 220/3.8, 4.02, 220/3.2, 3.94, 4.26; 439/535; 248/906
See application file for complete search history.

(56) References Cited

U.S. PATENT DOCUMENTS

| | | | |
|---|---|---|---|
| 3,870,347 A | | 3/1975 | Haubenestel |
| 4,936,478 A | * | 6/1990 | Bozdeck .................... 220/3.92 |
| RE35,075 E | * | 10/1995 | Lammens, Jr. ............... 220/3.2 |
| 6,069,317 A | | 5/2000 | Wagganer |
| 6,527,302 B1 | | 3/2003 | Gault et al. |
| 6,737,575 B2 | | 5/2004 | Pyron |

* cited by examiner

*Primary Examiner*—Dhiru R. Patel (57) ABSTRACT

A conduit body assembly that can easily be reconfigured at a job site into any of several specific conduit body configurations, depending on the particular requirements at the site. The assembly includes a conduit body and one or more hubs that may be secured to the conduit body to form various conduit bodies such as LB, C, T, LL, or LR. The conduit body includes a bottom, side walls, end walls, and a top cover. The bottom, side walls, and end walls each include one or more threaded apertures and a threaded blank installed in each aperture. The hubs each include a threaded inner end. One or more blanks may be removed from the apertures on the conduit body and replaced by a hub at each such aperture to form various conduit bodies such as LB, C, T, LL, or LR. The conduit body assembly of the present invention makes it very simple for an installer to configure a conduit body to fit a particular need at the job site. The top cover may be removed to make wiring connections and then replaced to form a rain tight junction box at an intersection of electrical conduits.

13 Claims, 8 Drawing Sheets

RECONFIGURABLE CONDUIT BODY ASSEMBLY

This application is a Continuation-In-Part of U.S. patent application Ser. No. 11/393,202 filed Mar. 30, 2006 now abandoned, which is a Continuation-In-Part of U.S. patent application Ser. No. 11/264,484 filed Nov. 1, 2005 is now abandoned, both applications of which are referred to herein and incorporated in their entireties into the present invention.

FIELD OF THE INVENTION

This invention relates to junction boxes for electrical conduit to a panel and more specifically to a conduit body assembly that can easily be reconfigured by an installer in the field to meet a specifically desired configuration.

BACKGROUND OF THE INVENTION

Electrical conduit, including rigid conduit and electrical metal tubing (EMT), is frequently used for installing electrical cables in buildings. As the conduit is routed throughout a structure, various junction boxes, or conduit bodies as they are frequently termed, are required to be installed to permit routing electrical cables to their various loads and destinations. A system of nomenclature has been developed in the electrical industry to describe the various conduit body configurations. Each configuration includes a one or two letter designation, which is determined by the location of the conduit outlet locations on the conduit body. The conduit outlets can typically be located on the bottom, sides, or ends of the conduit body. As an example of this nomenclature, a conduit body having a conduit outlet on the bottom and another on the end, a bottom to end configuration, is commonly designated an "LB" conduit body. Other conduit bodies include a "C" conduit body for an end to end configuration, a "T" conduit body for a middle and two end configuration, and "LL" and "LR" conduit bodies for side to end configurations.

Conventional conduit bodies are therefore typically provided in several standard arrangements in an attempt to fulfill all the possible configurations that will be needed at the job site. Unfortunately, this requires electrical manufacturers to stock at least six different junction boxes to meet the anticipated applications in the field. A manufacturer would therefore typically stock at least five separate conduit bodies, including types LB, C, T, LL, and LR. Since there are at least six different trade sizes of rigid conduit and EMT, a manufacturer or a supplier of conduit bodies is required to stock about 30 separate rigid conduit bodies. Electricians must therefore carry a large number of separate conduit bodies to the job site in order to be prepared to wire the building.

U.S. patent application Ser. Nos. 11/264,484 and 11/393,202 disclosed conduit body assemblies that were reconfigurable in the field, thereby eliminating the need for conduit bodies having separate configurations. This enabled an installer to carry one assembly for each trade size to meet all possible anticipated conduit body configurations.

Although the aforementioned conduit body assemblies reduced stocking requirements and improved installer efficiency in the field, still further improvements are needed to simplify the installation of conduit bodies for rigid conduit or EMT.

SUMMARY OF THE INVENTION

The invention is a conduit body assembly that can easily be reconfigured at a job site into any of several specific conduit body configurations, depending on the particular requirements at the site. The assembly includes a conduit body and one or more hubs that may be secured to the conduit body to form various conduit bodies such as LB, C, T, LL, or LR. The conduit body includes a bottom, side walls, end walls, and a top cover. The bottom, side walls, and end walls each include one or more threaded apertures and a threaded blank installed in each aperture. The hubs each include a threaded inner end. One or more blanks may be removed from the apertures on the conduit body and replaced by a hub at each such aperture to form various conduit bodies such as LB, C, T, LL, or LR. The conduit body assembly of the present invention makes it very simple for an installer to configure a conduit body to fit a particular need at the job site. The top cover may be removed to make wiring connections and then replaced to form a rain tight junction box at an intersection of electrical conduits.

OBJECTS AND ADVANTAGES

Several advantages are achieved with the conduit body assembly of the present invention, including:
(1) One conduit body assembly is capable of providing any specific conduit body configuration needed for a particular job.
(2) The conduit body assembly significantly reduces stocking requirements for any particular trade size conduit.
(3) The conduit body assembly can be reconfigured to change the number of conduit connection points without the use of fasteners or sealing members. As a result of using blanks and hubs that are directly threaded into the conduit body, the time of reconfiguration is significantly reduced over prior art conduit bodies in which several screws must be removed and reattached to reconfigure them.
(4) The conduit body includes side walls and end walls having a uniform thickness, thereby lowering cost of manufacture.
(5) A conduit body of any particular configuration may be easily assembled at the job site.
(6) By having blanks and hubs that thread directly into the conduit body, a rain tight junction box is maintained at any time the conduit body is reconfigured.

These and other objects and advantages of the present invention will be better understood by reading the following description along with reference to the drawings.

INDEX TO REFERENCE NUMERALS IN DRAWINGS 20 conduit body assembly
22 hollow body
24 threaded aperture
26 blank
28 hub
30 bottom of hollow body
32 side wall of hollow body
34 end wall of hollow body
36 top cover
38 open top
40 inner cavity
42 top rim
44 threaded bore
46 flange of blank
48 outer face of blank
49 threaded nose portion of blank
50 slot in blank
51 threads on blank
52 flat shoulder of blank
54 tubular outer end of hub
56 threaded nose portion of hub
58 flange
60 shoulder of hub
62 outer lid of top cover
64 top surface
66 bottom surface
68 peripheral flange
70 hole in top cover
72 gasket
74 hole in gasket
76 inner periphery
78 fastener
82 conduit
84 C conduit body
86 flat surface
88 bottom portion of hollow body
90 top portion of hollow body
92 sidewall of tubular outer end of hub
94 first conduit attachment arrangement
96 threaded bore
97 fastener
98 EMT
100 socket
102 second conduit attachment arrangement
104 threads
106 rigid conduit

DETAILED DESCRIPTION OF THE INVENTION

Figure 12:
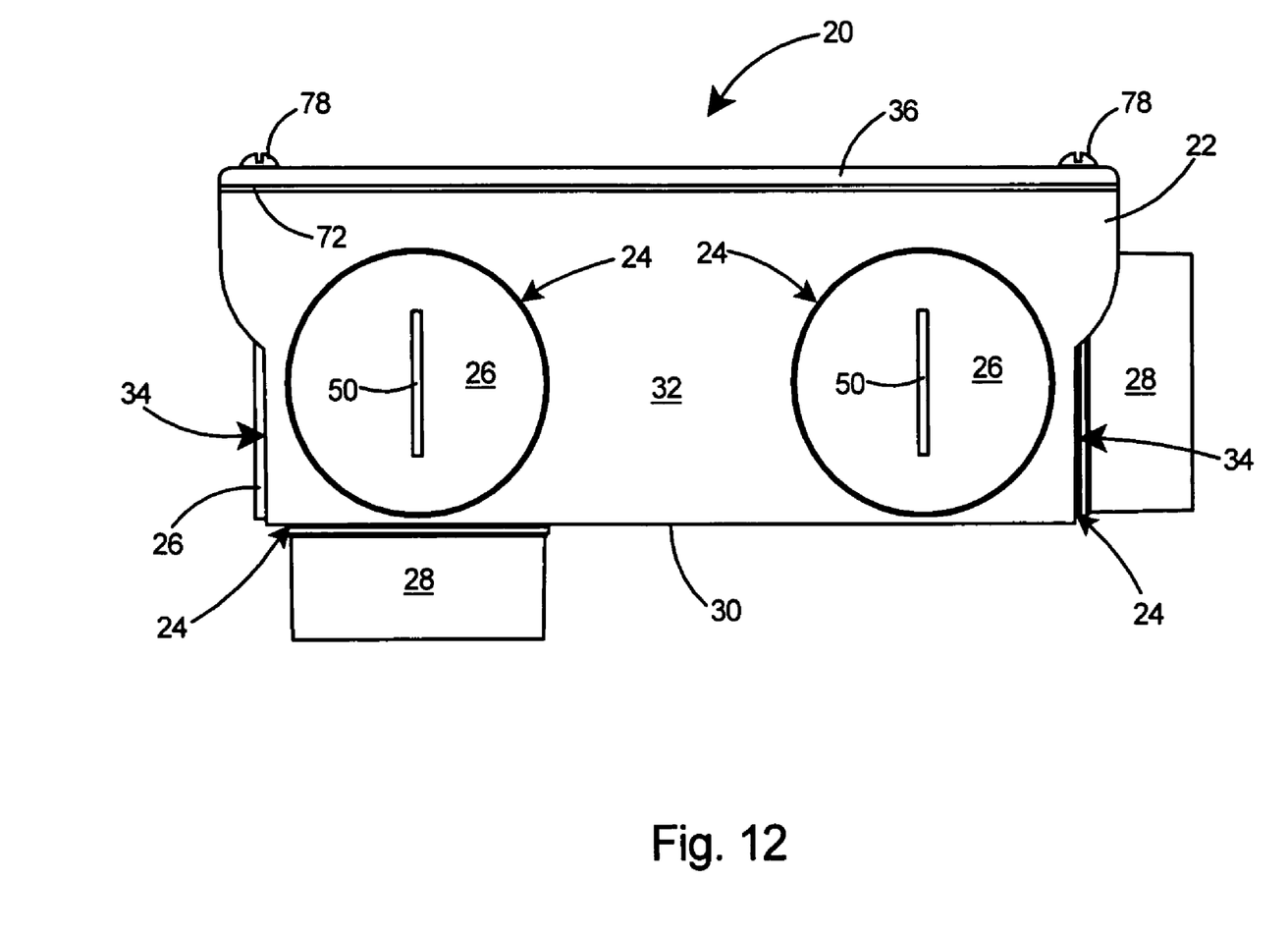
FIG. 12 is a side view of an LB conduit body formed from the conduit body assembly of the present invention.

With reference to FIG. 12 there is shown a preferred embodiment of the present invention, a conduit body assembly 20 including a hollow body 22 having a plurality of threaded apertures 24 therein in the hollow body. The conduit body assembly 20 includes blanks 26 closing off some of the apertures 24 and hubs 28 closing off other of the apertures 24. The hollow body 22 includes a bottom 30, two side walls 32, two end walls 34, and a top cover 36.

Figure 15A:
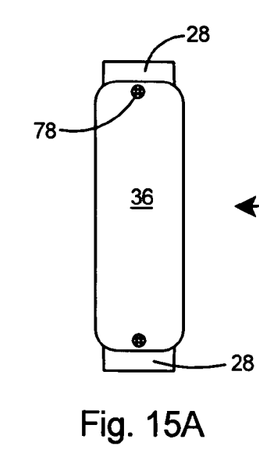
FIGS. 15A-15E are overhead views of conduit bodies in various configurations formed from the conduit body assembly of the present invention, including type C, T, LR, LL, and X conduit bodies.
Figure 15B:
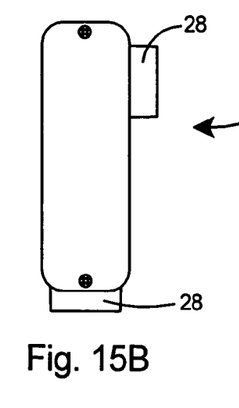
Figure 15C:
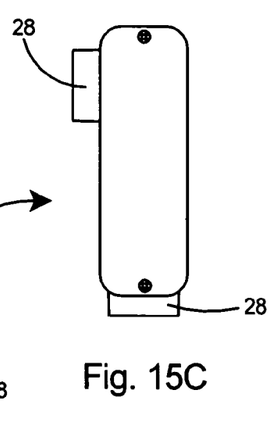
Figure 15D:
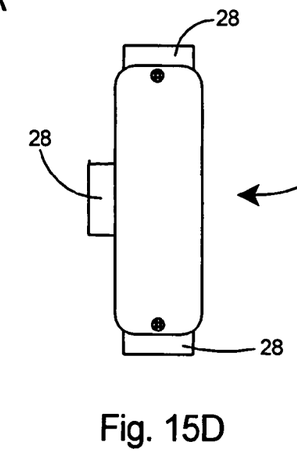
Figure 15E:
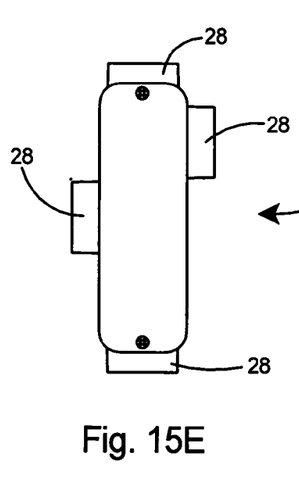

Conventional conduit bodies are typically manufactured and sold in several fixed configurations to fulfill the needs of technicians who are installing rigid conduit or EMT in buildings for the purpose of routing electrical cables therein. At the job site, to provide a junction box at the intersection of two or more cable runs, an installer would need to have on hand at least five separate conduit bodies, such as types LB, C, T, LL, and LR, and select the proper conduit body to provide the proper junction box for the particular location. The conduit body assembly 20 depicted in FIG. 12 is configured as an "LB" type, with a hub 28 on the bottom 30 of the hollow body 22 and a hub 28 on the end 34 of the hollow body 22. Although the conduit body assembly 20 in FIG. 12 is in an LB configuration, it could easily be reconfigured to a C, LL, or LR configuration as shown in the overhead views of each configuration in FIGS. 15A-15C. By having extra hubs on hand, an installer could also easily reconfigure the conduit body assembly 20 of FIG. 12 into a type T or X conduit body as shown in FIG. 15D or 15E. As will be described herein the conduit body assembly 20 of the present invention can be easily reconfigured into any desired configuration at the job site by removing blanks 26 from the hollow body 22 and installing hubs 28 in their place or vice versa.

Figure 1:
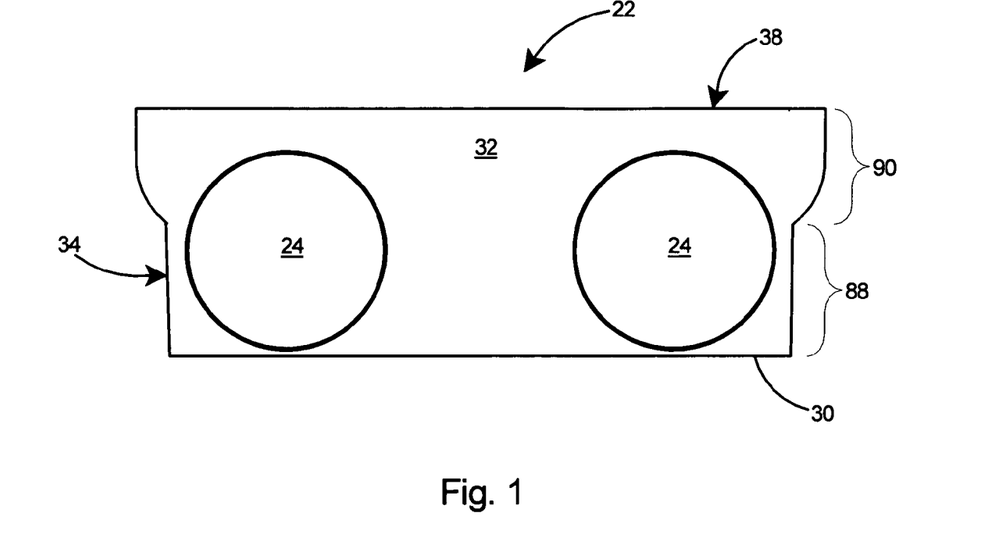
FIG. 1 is a side view of a hollow body that forms a portion of the conduit body assembly of the present invention.
Figure 2:
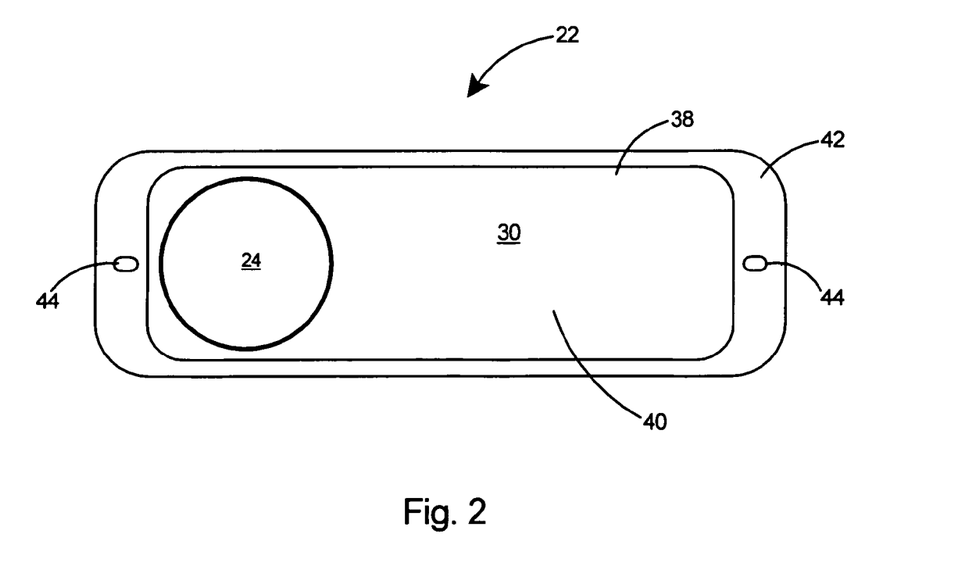
FIG. 2 is a top view of the hollow body of FIG. 1.
Figure 3:
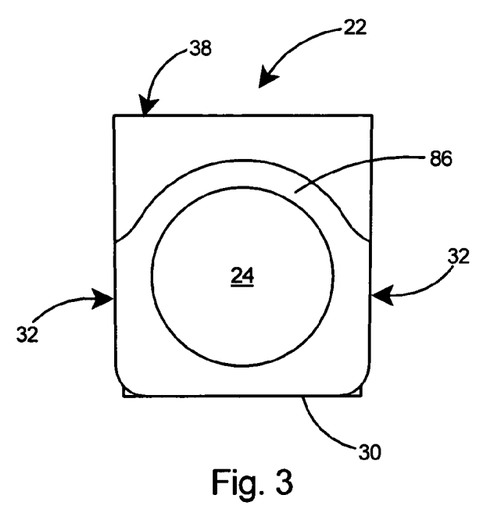
FIG. 3 is an end view of the hollow body of FIG. 1.

Referring to FIGS. 1-3, the preferred embodiment of the hollow body 22 has at least 6 threaded apertures 24 including at least one aperture 24 in each side wall 32, at least one aperture 24 in each end wall 34, and at least one aperture 24 in the bottom wall 30. The hollow body 22 includes an open top 38, an inner cavity 40, a top rim 42 at the open top 38, and threaded bores 44 in the top rim 42. The bottom wall 30, two side walls 32, and two end walls 34 are of a substantially uniform thickness.

Figure 4:
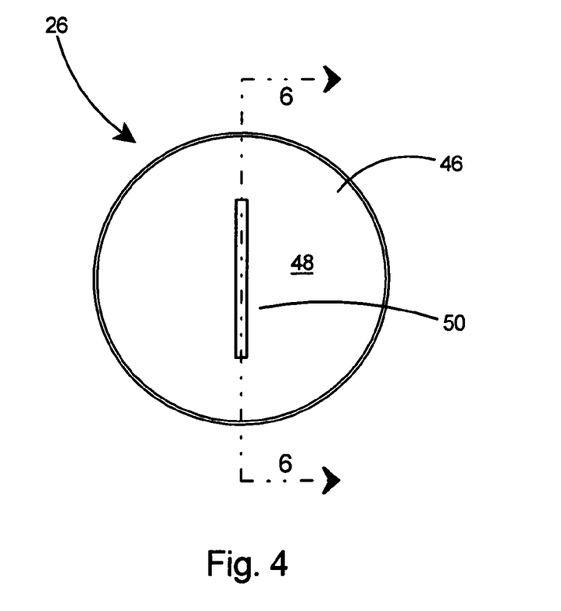
FIG. 4 is a front view of a blank that forms a portion of the conduit body assembly of the present invention.
Figure 5:
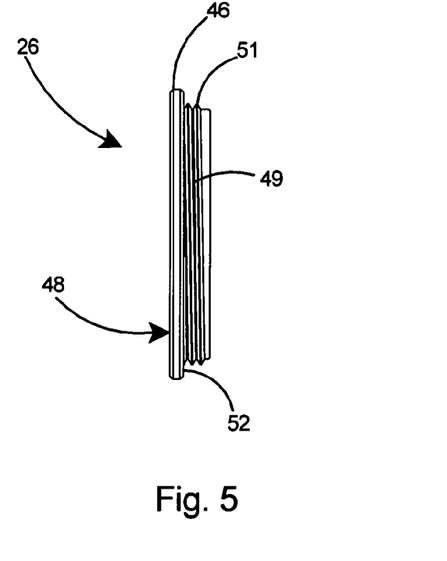
FIG. 5 is a side view of the blank of FIG. 4.
Figure 6:
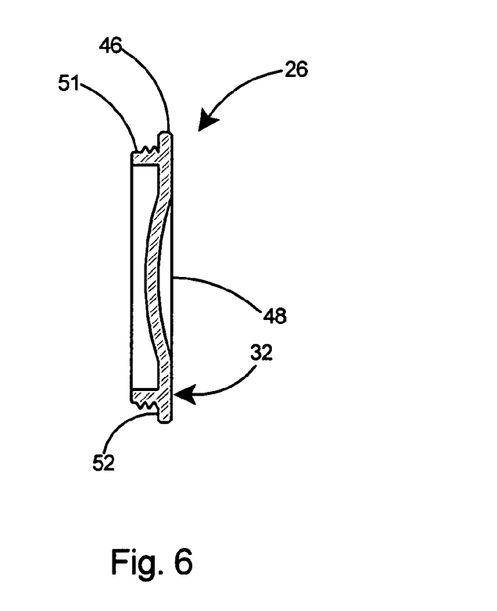
FIG. 6 is a sectional view of the blank taken along line 6-6 of FIG. 4.

With reference to FIGS. 4-6, the blank 26 includes a flange 46 having an outer face 48, a slot 50 in the outer face 48, a threaded nose portion 49, and a flat shoulder 52 at the juncture of the flange 46 and the nose portion 49. As shown in FIG. 6, the slot 50 is preferably arc-shaped. The threads 51 extend from the outer surface of the nose portion 49.

Figures 7, 7A, 7B, 8:
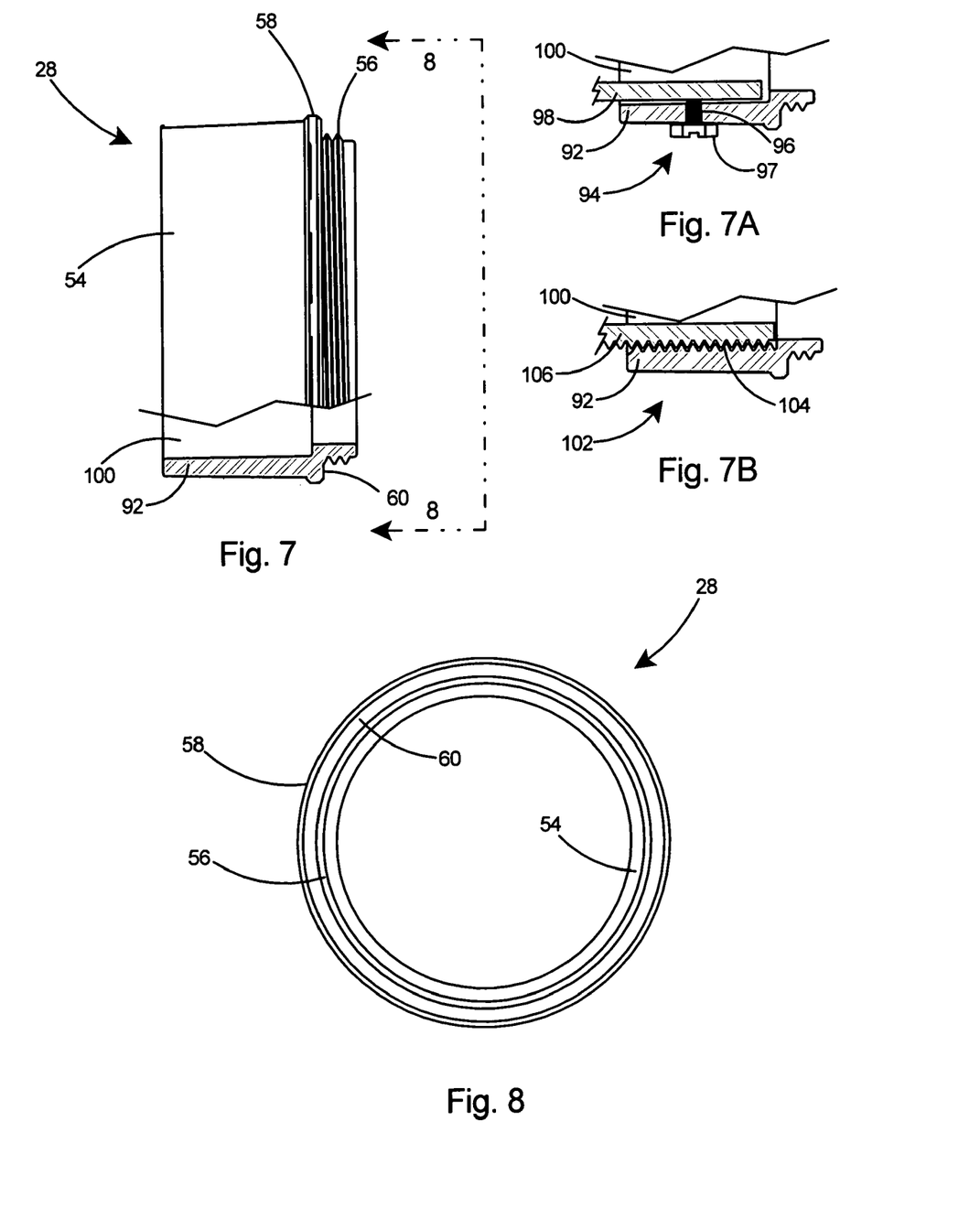
FIG. 7 is a combination side and sectional view of a hub that forms a portion of the conduit body assembly of the present invention.
FIG. 7A is a sectional view of the sidewall of the hub of FIG. 7 including a first conduit attachment arrangement.
FIG. 7B is a sectional view of the sidewall of the hub of FIG. 7 including a second conduit attachment arrangement.
FIG. 8 is a front view of the hub taken along line 8-8 of FIG. 7.

Referring to FIGS. 7 and 8, the hub 28 includes a tubular outer end 54, a threaded nose portion 56, an intermediate flange 58, and a shoulder 60 on the side of the flange 58 facing the nose portion 56.

Figure 9:
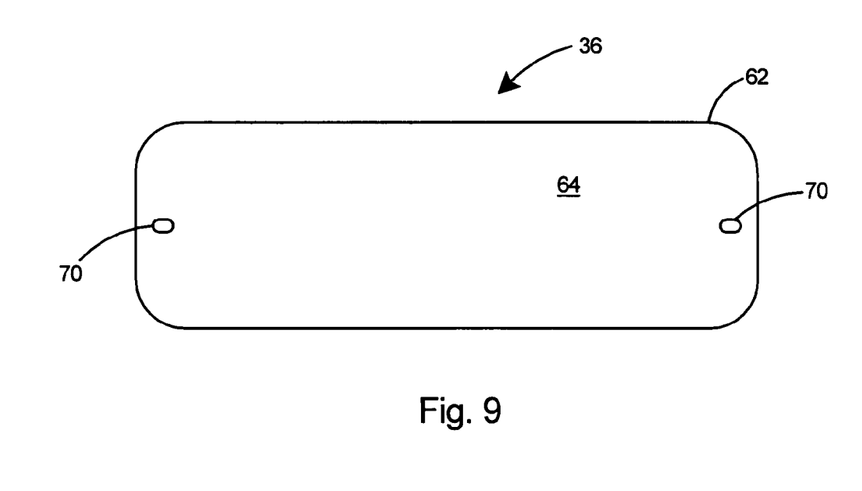
FIG. 9 is a plan view of a top cover that forms a portion of the conduit body assembly of the present invention.
Figure 10:
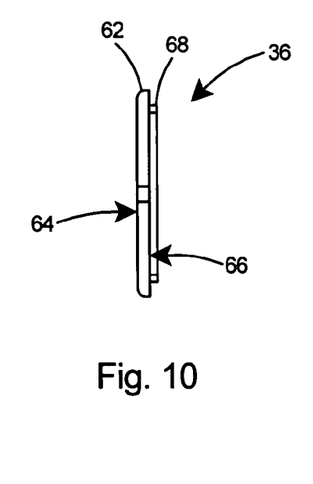
FIG. 10 is a side view of the top cover of FIG. 9.

As shown in FIGS. 9 and 10, the top cover 36 includes an outer lid 62 having a top surface 64 and a bottom surface 66, a peripheral flange 68 extending from the bottom surface 66, and holes 70 in the outer lid 62.

Figure 11:
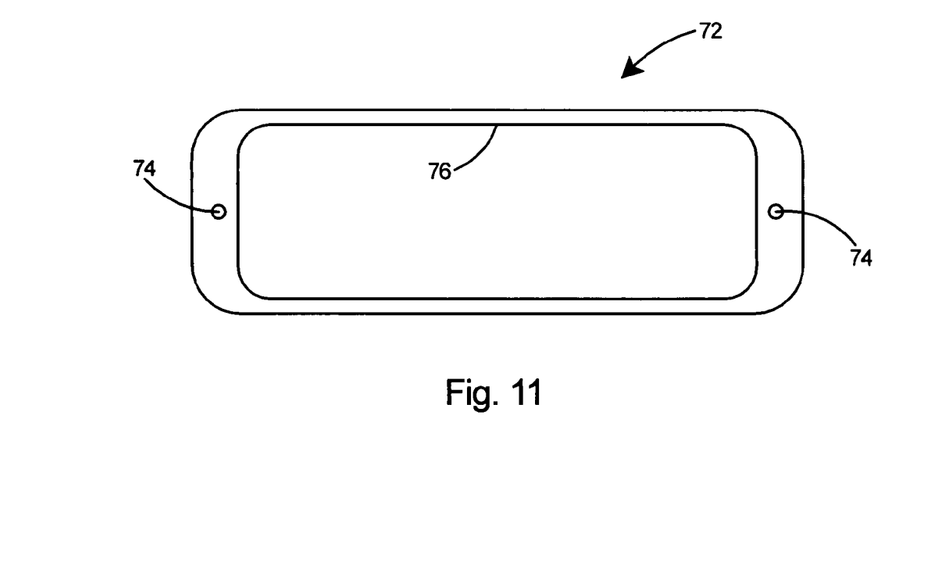
FIG. 11 is a plan view of a gasket that forms a portion of the conduit body assembly of the present invention.

To achieve a rain-tight seal at the top of the conduit body, as shown in FIG. 11, the conduit body assembly includes an optional gasket 72. The gasket 72 includes holes 74 therein and an inner periphery 76 to fit over the peripheral flange 68 of the top cover 36 (see FIG. 10).

Figure 13:
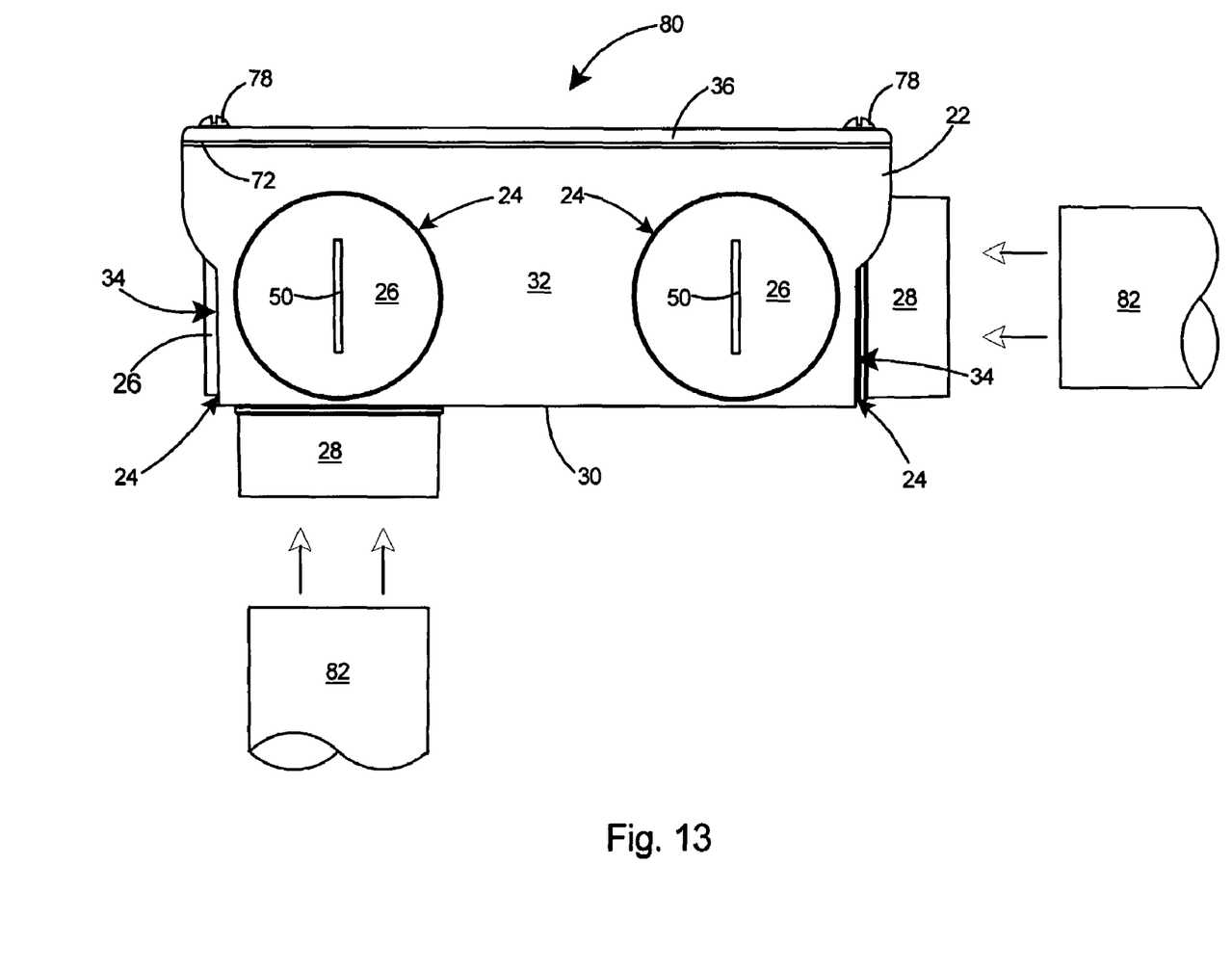
FIG. 13 is a side view of an LB conduit body with conduit exploded away from and in alignment to be inserted within the hubs of the conduit body.
Figure 14:
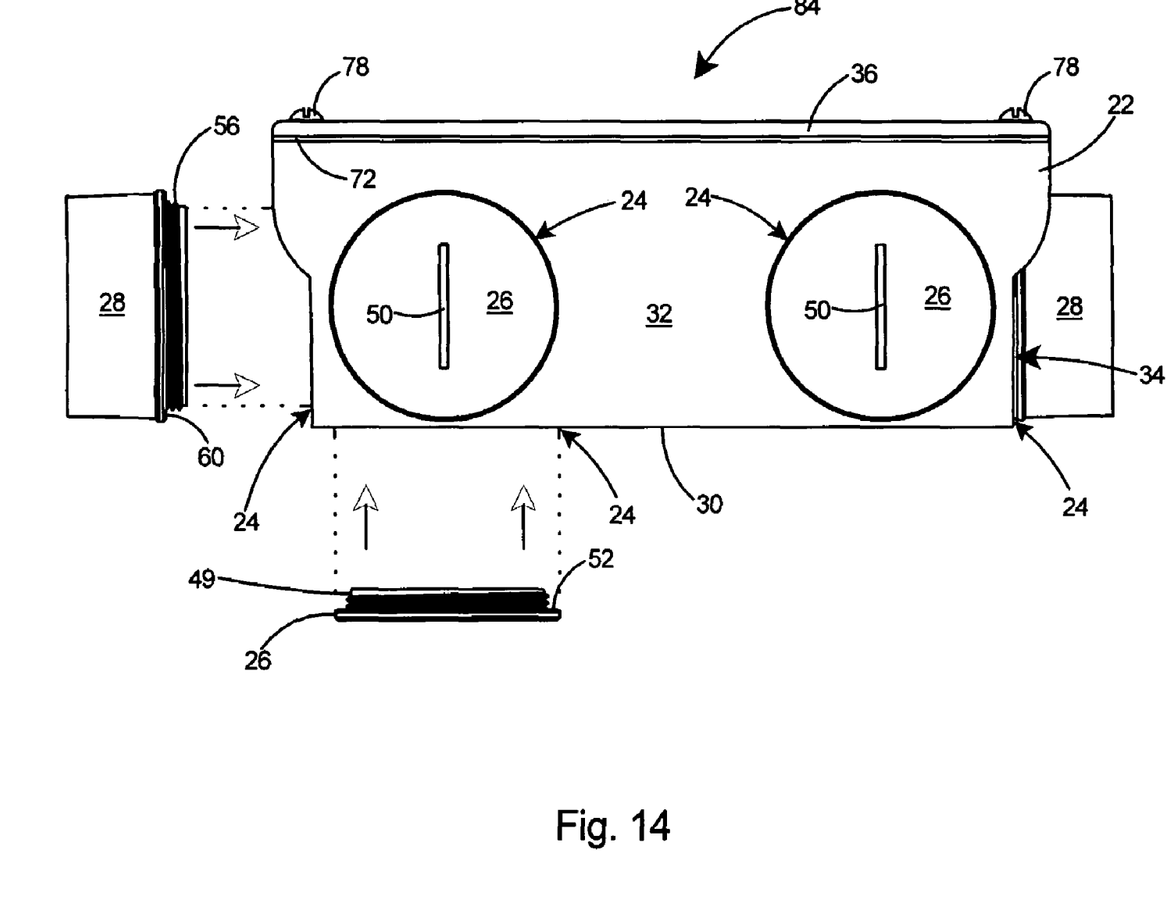
FIG. 14 is a side view of a conduit body in which the LB conduit body of FIG. 12 is being converted to a C conduit body with a hub being secured at one end and a blank being secured at the bottom of the conduit body.

For an understanding of the operation of the conduit body assembly 20 of the present invention, reference is made to FIGS. 12-14. The conduit body assembly 20 includes the hollow body 22 and preferably at least six threaded apertures 24. If provided in an LB configuration as shown in FIG. 12, two hubs 28 are secured to threaded apertures 24 in the hollow body 22. Threaded blanks 26 are secured into the remaining threaded apertures 24 and the top cover 36 is secured to the hollow body 22, with a gasket 72 sandwiched therebetween, by fasteners 78 to provide a rain tight LB conduit body 20. If an LB conduit body is required at the job site, no reconfiguration is required and an installer need only insert conduit 82 as shown in FIG. 13. However, if for example another configuration of conduit body is required, such as a C conduit body, the installer simply removes the hub 28 from the bottom 30 and the blank 26 from the left end of the LB conduit body 20 of FIG. 13, and installs the hub 28 by threading it into the threaded aperture 24 in the left end of the conduit body as shown in FIG. 14. The blank 26 that was removed from the left end of the conduit body is then threaded into the threaded aperture 24 in the bottom 30 of the conduit body to create a C type conduit body 84 (see FIG. 14) with a hub 28 at each end of the hollow body 22. The slots 50 in each blank 26 provide a convenient means for an installer to easily remove and reinstall the blanks at a job site. The blank 26 can be easily loosened from or tightened into a threaded aperture 24 by inserting a coin or the blade of a flat bladed screwdriver into the slot 50 to obtain enough leverage to loosen or tighten the blank 26. The hubs 28 can be loosened or installed in the threaded apertures by hand or the use of pliers or similar hand tools. The flat shoulder 52 of the blank 26 and the shoulder 60 of the hub 28 extend outwards from the respective nose portions 49 and 56 of the blank 26 and hub 28 respectfully. When a blank 26 is tightened into an aperture 24, the flat shoulder 52 seals against the outer wall of the hollow body 22 around the periphery of the aperture 24 and creates a rain-tight seal. Likewise, when a hub 28 is tightened into an aperture 24, the shoulder 60 of the hub 28 also seals against the outer wall of the hollow body 22, around the periphery of the aperture 24, and creates a rain-tight seal. Thus, referring to FIG. 14, when the hub 28 in alignment on the left side of the hollow body 22 is screwed into the aperture 24 on that side of the hollow body 22, a rain-tight seal is created between the hub 28 and the hollow body 22. In the same manner, when the blank 26 at the bottom left of the hollow body 22 is screwed into the aperture on the bottom of the hollow body 22, a rain-tight seal is created between the blank 26 and the hollow body 22. After the hub 28 and the blank 26 are tightened therein into the respective apertures, the LB conduit body 20 of FIG. 12 is reconfigured into the C conduit body 84 of FIG. 14.

With reference to FIGS. 15A-15E, in the same manner as described above, the conduit body assembly of the present invention can be converted into a conduit body of any desired configuration, including configurations C, LL, LR, T, or X. In operating the present invention, an installer would typically carry additional hubs 28 to a job site in addition to the conduit body assembly. Therefore, with additional hubs 28 on hand, an installer could easily reconfigure the conduit body into a T or X configuration, as shown in FIGS. 15D and 15E, by removing the proper blank and installing a hub 28 in its place.

After being configured into one of the desired conduit body configurations shown in FIGS. 15A-15E, the holes 74 in the gasket 72 (see FIG. 11) and the holes 70 in the top cover 36 (see FIG. 9) are aligned axially with the threaded bores 44 in the top rim 42 of the hollow body 22 (see FIG. 2) and the top cover 36 then secured to the hollow body 22 by fasteners 78 (see FIG. 12) driven through the top cover 36 and gasket 72 and into the threaded bores 44 (see FIG. 2) in the top rim 42. The gasket 72 provides a rain-tight seal between the top cover 36 and the hollow body 22.

Therefore, in the manner described herein, one or more of the threaded blanks 26 may be removed from the threaded apertures 24 and replaced with one or more of the hubs 28 to create a conduit body of any desired configuration.

As shown in FIGS. 3 and 5, the end wall 34 of the hollow body 22 includes a flat surface 86 surrounding the threaded aperture 24. When a blank is screwed into the threaded aperture 24, the flat shoulder 52 of the blank 26 engages the flat surface 86 of the end wall 34 and creates a rain-tight seal. In a similar manner, the shoulder 60 of the hub (see FIG. 7) when screwed into a threaded aperture 24 will engage the flat surface 86 of the end wall 34 and create a rain-tight seal. The side walls 32 of the hollow body 22 also include a flat surface surrounding the threaded aperture 24 to provide a rain-tight seal when either a blank 26 or hub 28 are screwed therein.

With reference to FIG. 1, the hollow body 22 further includes a bottom portion 88 and a top portion 90. The bottom portion 88 includes straight end walls 34 and the top portion 90 flares outwardly from the bottom portion 88. The flared top portion 90 provides additional space to improve access for making wiring connections within the inner cavity within the hollow body 22.

With reference to FIG. 7, the tubular outer end 54 of the hub 28 further includes a sidewall 92 having a conduit attachment arrangement therein. As shown in FIG. 7A, a first conduit attachment arrangement 94 includes a threaded bore 96 in the sidewall 92 of the hub 28 and a fastener 97 partially threaded within the threaded bore 96 of the and frictionally held therein. The fastener 97 can be tightened to secure EMT 98 into the socket 100 in the tubular outer end 54 of the hub 28. As shown in FIG. 7B, a second conduit attachment arrangement 102 includes threads 104 on the interior surface of the tubular outer end 54 of the hub 28. Rigid conduit 106 can be secured to the hub 28 by screwing the conduit directly into the threads 104.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A conduit body assembly comprising:
  a hollow body including a bottom, side walls, end walls, and an open top;
  one or more threaded apertures in said side walls and end walls of said hollow body;
  a threaded blank secured in one or more of said threaded apertures, said blank including a flange
  a nose portion extending from said flange, said nose portion having an outer surface;

threads extending outwardly from said outer surface of said nose portion;

one or more hubs, said hubs including a threaded inner end and a tubular outer end; and a top cover for closing off said open top of said hollow body;

whereby one or more of said threaded blanks may be removed from said threaded apertures and replaced with one or more of said hubs to create a conduit body of a desired configuration.

2. The conduit body assembly of claim 1 including flat surfaces surrounding said threaded apertures in said side walls and said end walls.

3. The conduit body assembly of claim 1 including a flat shoulder on said hub extending outwards of and surrounding said threaded inner end.

4. The conduit body assembly of claim 1 including
a top rim at said open top of said hollow body;
threaded bores in said top rim;
holes in said top cover;
fasteners;
said holes in said top cover capable of being aligned axially with said threaded bores in said top rim of said hollow body; and
said top cover capable of being secured thereto to said hollow body by driving said fasteners through said holes in said top cover and into said threaded bores in said rim.

5. The conduit body assembly of claim 4 including a gasket for sealing between said top cover and said top rim of said hollow body.

6. The conduit body assembly of claim 1 wherein
said blank includes an outer face; and
a slot in said outer face.

7. The conduit body assembly of claim 6 wherein said slot is arc shaped.

8. The conduit body assembly of claim 1 wherein
said hollow body includes a bottom portion and a top portion;
said bottom portion includes straight side walls; and
said top portion flares outwardly from said bottom portion.

9. The conduit body assembly of claim 1 wherein said hollow body includes at least 6 of said threaded apertures.

10. The conduit body assembly of claim 1 wherein
said outer end of said hub includes a sidewall; and
said sidewall of said hub includes a conduit attachment arrangement therein.

11. The conduit body assembly of claim 1 wherein
said bottom of said hollow body includes a bottom wall; and
said bottom wall, said side walls, and said end walls of said hollow body are of substantially uniform thickness.

12. A conduit body assembly comprising:
a hollow body including a bottom, side walls, end walls, and an open top;
one or more threaded apertures in said side walls and end walls of said hollow body;
a threaded blank secured in one or more of said threaded apertures;
one or more hubs, said hubs including a threaded inner end, a tubular outer end, and a sidewall in said tubular outer end of said hub;
a top cover for closing off said open top of said hollow body whereby one or more of said threaded blanks may be removed from said threaded apertures and replaced with one or more of said hubs to create a conduit body of a desired configuration;
a conduit attachment arrangement in said sidewall of said hub; and
said conduit attachment arrangement including a socket in said tubular outer end of said hub, a threaded bore in said sidewall of said hub, and a conduit fastener partially threaded within said threaded bore of said sidewall of said hub, said conduit fastener frictionally held therein in said threaded bore;
whereby electrical metal tubing can be secured to said hub by inserting the electrical metal tubing into said socket and tightening said conduit fastener against the electrical metal tubing.

13. The conduit body assembly of claim 12 wherein said conduit attachment arrangement includes
an interior surface on said tubular outer end of said hub; and
threads on said interior surface of said tubular outer end, whereby rigid conduit can be secured to said hub by screwing the rigid conduit into said threads.

\* \* \* \* \*